US008566055B1

(12) United States Patent
Vidmar et al.

(10) Patent No.: US 8,566,055 B1
(45) Date of Patent: Oct. 22, 2013

(54) GYRO INDEXING COMPENSATION METHOD AND SYSTEM

(75) Inventors: Anthony Vidmar, Wyndmoor, PA (US); Michael J. Wolfrom, Haddon Township, NJ (US); Daniel P. Bergen, II, Belford, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 516 days.

(21) Appl. No.: 12/909,011

(22) Filed: Oct. 21, 2010

Related U.S. Application Data

(60) Provisional application No. 61/304,033, filed on Feb. 12, 2010, provisional application No. 61/304,044, filed on Feb. 12, 2010.

(51) Int. Cl.
*G01C 19/00* (2013.01)
*G01C 21/18* (2006.01)

(52) U.S. Cl.
USPC .................. 702/92; 701/4; 701/505; 701/506

(58) Field of Classification Search
USPC .................... 702/92; 701/213, 200, 220, 201; 364/453, 449.1
See application file for complete search history.

(56) References Cited

U.S. PATENT DOCUMENTS

| | | | |
|---|---|---|---|
| 4,542,647 A | | 9/1985 | Molnar |
| 4,634,283 A | | 1/1987 | Mark et al. |
| 4,754,280 A | * | 6/1988 | Brown et al. ........... 342/357.59 |
| 5,434,670 A | | 7/1995 | Albers et al. |
| 5,442,442 A | | 8/1995 | Kanegsberg et al. |
| 5,543,804 A | * | 8/1996 | Buchler et al. ........... 342/357.23 |
| 5,640,325 A | * | 6/1997 | Banbrook et al. ............ 701/505 |
| 6,421,622 B1 | * | 7/2002 | Horton et al. .................... 702/95 |
| 6,778,908 B2 | * | 8/2004 | Martorana et al. ................ 702/9 |
| 7,065,888 B2 | * | 6/2006 | Jaklitsch et al. ................ 33/286 |
| 7,089,150 B2 | | 8/2006 | Phillips, III |
| 7,093,370 B2 | * | 8/2006 | Hansberry et al. .............. 33/313 |
| 7,421,343 B2 | * | 9/2008 | Hawkinson .................... 701/510 |

(Continued)

OTHER PUBLICATIONS

Bar-Shalom, Y. et al.; Estimation with Applications to Tracking and Navigation: Theory Algorithms and Software; John Wiley & Sons, Inc.; New York, NY; 2001.
AN/WSN-7(V)1 Inertial Navigation System: FAS, Military Analysis Network. http://www.fas.org/man/dod-101/sys/ship/weaps/an-wsn-7.htm. Jun. 30, 1999.

*Primary Examiner* — Andrew Schechter
*Assistant Examiner* — Daniel Kessie
(74) *Attorney, Agent, or Firm* — Howard IP Law Group, P.C.

(57) ABSTRACT

A method is provided for removing gimbal periodic reorientation (indexing) readout errors in a navigation system having multiple IMUs mounted to a platform. Each IMU has multiple gyroscopes providing attitude outputs. Attitude readout errors bias due to periodic gimbal motions is determined in each IMU along each gyroscope attitude axis. Attitude outputs of the gyroscopes are time-aligned, as necessary. Onset times of indexing of each gyroscope is determined. A difference is formed between gyroscope attitude outputs. Steps in this difference of attitude outputs are assigned to the respective gyroscope causing the step in attitude. Cumulative sums of the steps associated with the respective gyroscopes are formed. The mean and linear trend in the respective cumulative sums are removed from the respective cumulative sums to form the final error correction, corresponding to the time interval associated with the steps. Each final error level correction is subtracted from the attitude output from the respective gyroscope at the time of indexing associated with that final correction.

18 Claims, 9 Drawing Sheets

(56) References Cited

U.S. PATENT DOCUMENTS

| | | | |
|---|---|---|---|
| 7,979,231 B2 * | 7/2011 | Eckert | 702/104 |
| 8,275,582 B1 * | 9/2012 | Vidmar et al. | 702/189 |
| 8,290,744 B2 * | 10/2012 | Brady et al. | 702/183 |
| 2004/0030464 A1 * | 2/2004 | Buchler et al. | 701/4 |
| 2005/0022402 A1 * | 2/2005 | Ash et al. | 33/321 |
| 2006/0015248 A1 * | 1/2006 | Huddle et al. | 701/207 |
| 2006/0138988 A1 * | 6/2006 | Kaneko et al. | 318/560 |
| 2011/0093250 A1 * | 4/2011 | Lin | 703/7 |
| 2011/0320153 A1 * | 12/2011 | Lightcap et al. | 702/94 |

\* cited by examiner

GYRO INDEXING COMPENSATION METHOD AND SYSTEM

RELATED APPLICATIONS

This application claims the benefit of U.S. Provisional Application No. 61/304,033, filed Feb. 12, 2010 and U.S. Provisional Application No. 61/304,044, filed Feb. 12, 2010, the entire disclosures of which are incorporated herein by reference.

STATEMENT REGARDING FEDERALLY SPONSORED RESEARCH OR DEVELOPMENT

This invention was made with Government Support under Contract No. N00024-03-C-6110 awarded by the Department of the Navy. The Government has certain rights in this invention.

FIELD

The present disclosure relates to methods and systems for recovering attitude accuracy from inertial navigation systems (INSs) with redundant inertial measurement units (IMUs) that employ gimbals to periodically reorient to improve integrated accelerometer output accuracy.

BACKGROUND

Navigation data for a moving platform, such as a ship, includes current position and velocity. Attitude data includes orientation (i.e., roll, pitch and heading measurements) and orientation rate of the platform in a reference frame. Measurements of a tracked target may be used by multiple processing functions and may generally involve transformation from the platform's coordinate system to an external coordinate system.

This transformation matrix is a function of roll, pitch, and heading of the platform's orientation with respect to the East, North, and Up (ENU) coordinate frame. These angular orientations are measured by component gyroscopes of an inertial measurement unit IMU For example, an inertial measurement unit (IMU) of the INS may contain three single-axis accelerometers and three gyroscopes, where, for example, each gyroscope is a single degree of freedom (SDOF) ring laser gyroscope (RLG). A single-axis accelerometer mounted on a moving platform measures linear acceleration experienced along its measurement axis. The three single-axis accelerometers are mounted on three mutually orthogonal axes. These three mutually orthogonal axes define the coordinate frame of the IMU. This frame is aligned to the platform by physically aligning the three orthogonal axes of the IMU to the three orthogonal axes of the platform. This allows accelerations measured by the IMU in each axis to constitute an acceleration vector of the platform. The accelerometers need the three RLGs to measure the orientation of the platform with respect to ENU fixed coordinate frame. Thus, the IMU provides both the linear acceleration of the platform and the angular orientations (e.g. roll, pitch, heading turns). With reference to an initial position and attitude, the IMU provides the information about the current position, velocity, and attitude of the platform, allowing the platform to set and adjust its course and determine the location of any other objects that are being tracked and/or targeted by the platform.

The accelerometer measurements provide an acceleration vector with respect to the inertial frame of the IMU. In order to relate the accelerometer measurements to an Earth frame, the angular orientation of the accelerometer assembly with respect to the Earth is determined. For example, by integrating the acceleration vector twice, the position of the IMU can be obtained. This position can be converted to latitude and longitude with reference to an Earth model, e.g., World Geodetic System, revision 84 (WGS-84). The angular orientation of the IMU is measured by mounting the three RLGs on the three planes defined by the mutually orthogonal axes used for the accelerometers. The acceleration of the platform is measured by the IMUs with respect to the instantaneous ENU coordinate frame, which is referenced by the navigation data to the Earth Centered Earth Fixed (ECEF) coordinate frame of WGS-84. This acceleration vector is fed back to the computation of the velocity and position of the IMU, with respect to WGS-84. The SDOF RLG detects angular rotation around the axis normal to the plane containing the RLG. This provides the angular orientation of that axis.

These sensing elements (RLGs and accelerometers) are mounted on a sensor block assembly, which is mounted within a two-axis (dual axis) gimbal assembly. This dual axis gimbal assembly allows the axes for each RLG and accelerometer to be periodically reoriented during operation. This is accomplished by an inner gimbal that provides rotation in heading and an outer gimbal that allows rotation in roll. This periodic change of orientation allows the cumulative effects of small drift errors in the RLGs and accelerometers to cancel out.

The RLGs and accelerometers are subject to many sources of error. These include but are not limited to, random-walk error, gyro bias error, gyro scale factor error and accelerometer bias. Some of these errors lead to the bias of the output of RLGs and accelerometers. These biases lead to erroneous values for the orientation and position of the sensor block assembly. By reversing the orientation of the sensor block assembly periodically (e.g., every five minutes), a bound is imposed on the biases output from the RLGs and accelerometers.

This periodic reversal of the sensor axes is called indexing. In one example, the rotation of the gimbal assembly takes ten seconds to complete and occurs every five minutes. The orientation of the sensor block is held for five minutes (minus the 10 second rotation duration), therefore retaining the RLG and accelerometer biases with respect to the orientation of the axis being measured. The reorientations of the sensor block assembly change the magnitude and direction of the RLG and accelerometer biases, thereby, canceling out any cumulative effects due to the instrument biases. Indexing gives the IMU a capability to meet a better positional accuracy over a required time period, at the price of introducing a periodically varying mechanical positioning error in attitude.

FIG. 1 is a diagram showing a forward (FWD) and corresponding, aftward (AFT) IMU gyro attitude (either roll, pitch or yaw) angle output, compared to the (assumed, here, constant) truth attitude value. The true attitude angle θ is depicted by the dashed line, trace 105. Traces 100 and 102 are examples of attitude angle measurement produced by the FWD IMU gyroscopes (FWD gyro) and AFT IMU gyroscopes (AFT gyro), respectively. The traces 100, 102 can differ from the true attitude angle trace 105 by mean gyro attitude angle mean traces 101 and 103 from the true attitude. The difference between traces 100 and 101 and the difference between traces 101 and 103 are intended to show errors (biases) due to indexing. This indexing bias is piecewise constant for the interval defined by the indexing times. The transition between indexing biases is shown as instantaneous steps in the traces 100, 102. The idealized step function (to simplify initial presentation) transitions of the angular measurements due to indexing occur at the vertical dashed lines. These vertical dashed lines represent the times of indexing for the FWD and AFT gyros denoted by $t_i^f$, i=1, 2, 3, ... and $t_i^a$, i=1, 2, 3, ... respectively. Compensation for indexing errors in gyro output traces, 100 and 102, from the mean gyro attitude traces 101 and 103, respectively is desired. Compensation or correction of the mean gyro attitude traces 101 and 103, to the true attitude angle trace 105, requires reference to measurements external to the IMU platform, and is addressed herein. Such a process takes a longer period to resolve than the indexing period. The indexing biases slow convergence of such a process and are a remaining error in the attitude output. Attitude angle measurements of the AFT gyro are subtracted from the attitude angle measurements of the FWD gyro and this difference is plotted as curve 200 in FIG. 2A. The observed difference can be positive or negative and the transitions occur at the times of index.

SUMMARY

A method is disclosed herein for recovering attitude accuracy from two inertial measurement units of navigation system having two inertial measurement units on the same platform, each of the two inertial measurement units including three gyroscopes mounted, each gyroscope measuring and reporting as output the attitude of its axis with respect to the chosen coordinate system of the platform, each inertial measurement unit mounted in a set of gimbals, that periodically reorient the inertial measurement unit in an indexing process. The method comprises determining in a computer process, the error in the attitude output of each gyroscope due to errors of the finite precision and/or of the mechanical gimbal wear in the indexing process; obtaining in a computer process, time-aligned respective attitude outputs of the gyroscopes; determining and assigning in a computer process, cumulative second differences of the respective attitude outputs between inertial measurement units to the respective inertial measurement unit's gyroscope attitude output for the interval following the respective indexing event; determining in a computer process, the debiasing and detrending of the cumulative second differences as the final error correction; and storing final indexing error correction for all indexing intervals (for all three attitude outputs of each of both inertial measurement units) in a machine readable storage medium.

Also disclosed herein is a system for recovering attitude accuracy from two inertial measurement units of navigation system, each of the two inertial measurement units including three gyroscopes on a platform, each gyroscope measuring and reporting as output the attitude of its axis with respect to a selected coordinate system of the platform, each inertial measurement unit mounted in a set of gimbals, that periodically reorient the inertial measurement unit in an indexing process. The system comprises a machine readable storage medium; and a processor execution instructions for determining error in the attitude output of each gyroscope due to errors of finite precision and/or of mechanical gimbal wear in the indexing process; obtaining time-aligned respective attitude outputs of the gyroscopes; determining and assigning cumulative differences of the respective attitude outputs between inertial measurement units to the respective inertial measurement unit's gyroscope attitude output for an interval following the respective indexing event; determining debiasing and detrending of the cumulative differences as a final error correction; and storing the final indexing error correction for all three attitude outputs of each of the inertial measurement units in the machine readable storage medium.

DETAILED DESCRIPTION

Figure 1:
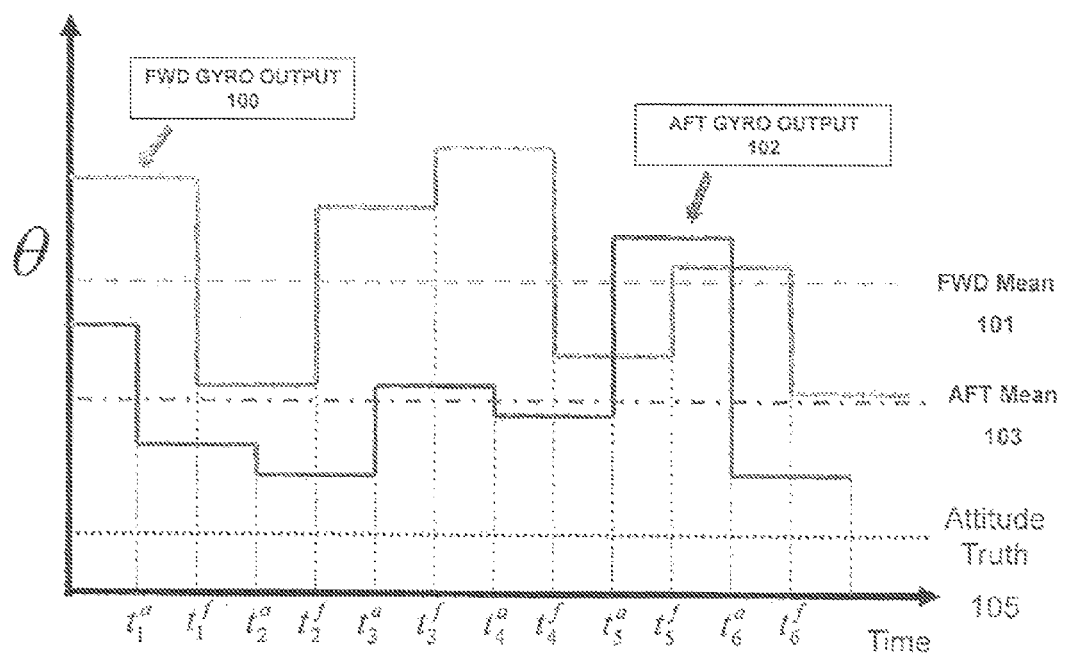
FIG. 1 is a diagram showing FWD and AFT gyro attitude angle outputs, compared to a constant truth attitude value.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, mounting, coupling and the like, such as "connected" and "interconnected," refer to a relationship wherein structures are secured or attached to one another either directly or indirectly through intervening structures, as well as both movable or rigid attachments or relationships, unless expressly described otherwise.

A typical INS may show errors in, for example, the heading attitude shown in FIG. 1 as the differences between the FWD gyro attitude angle measurement output trace 100 and the true attitude angle trace 105 and the AFT gyro attitude angle measurement output trace 102 and the true attitude angle trace 105, due to gimbal readout errors during each indexing interval. These errors are in addition to the overall mean long term heading bias of each gyroscope, the difference between the mean FWD gyro attitude angle trace 101 and the true attitude angle trace 105 and the difference between the mean AFT gyro attitude angle trace 104 and the true attitude angle trace 105.

Figure 3:
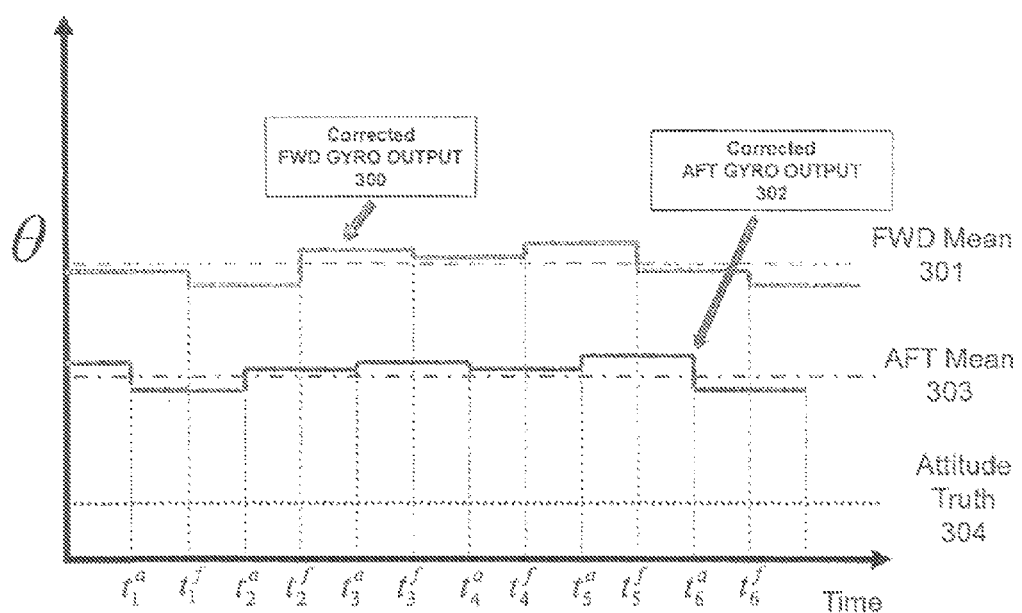
FIG. 3 is a diagram showing how a correction procedure described below reduces the periodic bias error incurred from the gimbal indexing motion about the mean attitude bias error.

FIG. 3 shows indexing error bias values which have been reduced by an algorithm performed by an exemplary INS. This algorithm is referred to herein as the Gyro Indexing Compensation Algorithm (GICA). This algorithm does not need to be implemented in real time, and may be executed in near real-time, for example. Alternatively, if the correction is being used only for analysis of past operational data, then batch or non-real-time execution is an option. The algorithm is applied to the FWD and AFT gyro attitude angle measurement difference trace 200 (angular difference) to achieve traces 300 and 302 in FIG. 3. The errors due to indexing are estimated from the angular difference and then the errors are removed from the measurements in FIG. 1. The mean attitude errors 301 and 303 are not removed by the algorithm.

Gyro Indexing Compensation Algorithm (GICA)

The angle and angular rate outputs from the INS are subject to additional errors due to the effects of the periodic gimbal reorientation of the sensor axes. The error in the angle output from the IMU due to the reorientation can be assumed to be essentially constant (due to the quantization level of the INS attitude data as captured) during the time from the end of the gimbal motion to the beginning of the gimbal motion of the next index. Thus, in one non-limiting example, where a ten second index operation is performed every five minutes, the error in the angle output is a four minute and fifty second bias to the attitude (which may be superimposed on a previously existing mean bias). Gimbal readout error can change over time as material surrounding pivot springs of the gimbal ages or, otherwise, degrades. The gimbal readout error also introduces errors in the attitude rate output.

Although the ten second index performed every five minutes example is used below to aid in describing the method, the method may be applied to INSs using any desired index duration and any desired period between successive indexing operations that allow time to accurately estimate the difference.

The GICA algorithm determines the indexing bias, and works in conjunction with a module that determines times when index operations occur.

The GICA algorithm utilizes the estimated times that the IMU gyros in the INS indexes and estimates the amount of error due to indexing in the attitude reported from the INS. This information may then be provided to a battlefield management system or weapon control system.

Figure 4:
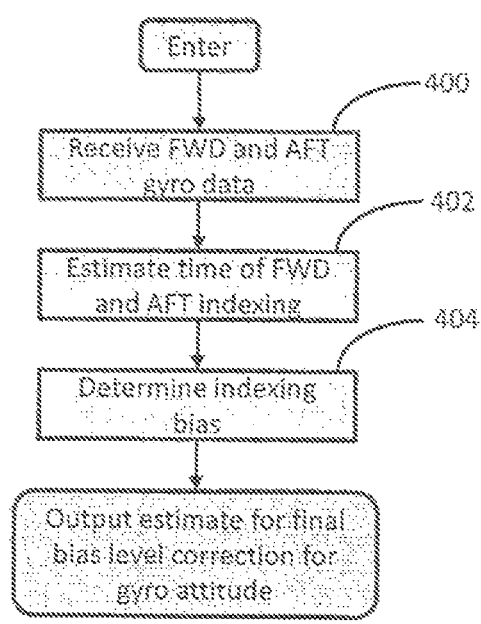
FIG. 4 is a high level flow chart of a process for determining indexing bias correction.

FIG. 4 is high level flow chart of a process for determining indexing bias correction.

At step 400 in FIG. 4, the indexing bias correction process commences by receiving measurements for the attitudes (roll, pitch and heading) and attitude rates (roll, pitch and heading rates) with time tags for both a FWD IMU gyroscope (FWD gyro) and the corresponding AFT IMU gyroscope (AFT gyro).

At step 402, the attitude rate data for the FWD and AFT gyros are then entered into an algorithm that generates estimates of the times that the gyros index. An example of a suitable algorithm for generating estimates of the times that the gyros index, is described in U.S. patent application Ser. No. 12/511,467, entitled "Method And System For Clock Synchronization Using Templated Adaptive Maneuver Detection." The entire disclosure of U.S. patent application Ser. No. 12/511,467 is incorporated herein by reference.

At step 404, the FWD and AFT gyro indexing times are then processed by an algorithm which estimates the indexing errors introduced in the reported attitude. This algorithm uses an estimate of the attitude difference between the FWD and AFT gyros in conjunction with the estimated indexing times to compute a correction for the FWD and AFT gyro attitudes. The absolute truth of the attitude angles, with the mean attitude errors of the FWD and AFT gyro attitude angles, is not needed. In addition the algorithm will output the corrections used to construct the corrected FWD and AFT gyro attitudes as well as an array of the estimated indexing biases for the FWD and AFT gyros. These additional outputs are used for diagnostic aide.

In some embodiments, the FWD and AFT gyros operate asynchronously from each other, so a time alignment of the outputs of the FWD and AFT gyros is performed before step 402. To allow estimation of bias at a given point in time when the gyroscope of one of the FWD or AFT gyro's indexes, outputs of the other one of the FWD and AFT gyros are interpolated. For example, an interpolated value of the AFT gyro's output is computed for the time when the FWD gyro begins indexing. Similarly, an interpolated value of the FWD gyros' output is computed for the time when the AFT gyro begins indexing. For real time operation, either the FWD or the AFT gyro output is extrapolated to the other gyro's time of measurement.

Although an example is provided below in which the FWD and AFT gyros index asynchronously, one of ordinary skill in the art can apply the algorithms in an INS having synchronous indexing of the FWD and AFT gyros, in which case no time alignment is required.

Estimation of Attitude Errors Due to Indexing

In some embodiments, the inertial measurement units (IMUs) of the inertial navigation system (INS) are mounted in gimbals and are periodically reoriented to one of a given number of different orientations with a fixed period between indexes. For example, in one embodiment, the IMUs are periodically reoriented to one of eight different orientations every five minutes. This reorientation is accomplished by a dual axis gimbal assembly that provides rotation in the heading and roll axes. Due to the order rotations from dual gimbals rotating, sixty-four different indexing readout errors are produced.

Each of the gimbal orientations (in a cyclic order sequence), called indexing, has an associated assumed constant error (once the gimbal motion stops) in reported attitude during the time between gimbal motions. This error changes periodically with the reorientation of the sensor axes during indexing. This error is in addition to any other mean error in the attitude reported by this IMU. In one embodiment, the magnitudes of the errors can be on the order of tenths of milliradians with a maximum value on the order of milliradians, as parts wear with age, for example.

The errors in attitude caused by indexing can not be estimated from the attitude alone. This is because that in the presence of platform motion the indexing error is relatively small (or the constructed IMU was poorly constructed) and there is no truth attitude reference to compare to, as the INS is intended to be the best available estimate of attitude.

In one embodiment, the process of estimating the error due to indexing includes two steps. The first step includes determining the attitude first difference between the attitude reported from the FWD gyro and the attitude reported from the AFT gyro to remove platform motion. This is an approximation, in that dynamic flexure of the platform would cause the attitude at the FWD and AFT gyros to differ in addition to their individual mean bias to attitude truth and indexing biases about the individual mean bias of each of the gyros. In one embodiment, the entire process is conducted dockside, to minimize platform flexure. The second step of the error estimating process includes estimating the change in the attitude difference (a difference of the attitude differences) after each indexing operation, and using the sequence of second differences to identify the error due to indexing at the time of index of each gyroscope (the FWD and AFT gyros of the FWD and AFT IMU).

In some embodiments, the two IMUs (FWD and AFT) report their respective-attitude data asynchronously. The difference of time synchronized attitudes is needed. In one embodiment, a Kalman filter can be used to predict one gyroscope attitude output to the output time of the other gyroscope to synchronize the time of both attitude inputs. In an alternative embodiment, non-real time operation of interpolating one gyroscope output to the output time of the other gyroscope, can be used.

Figure 2A:
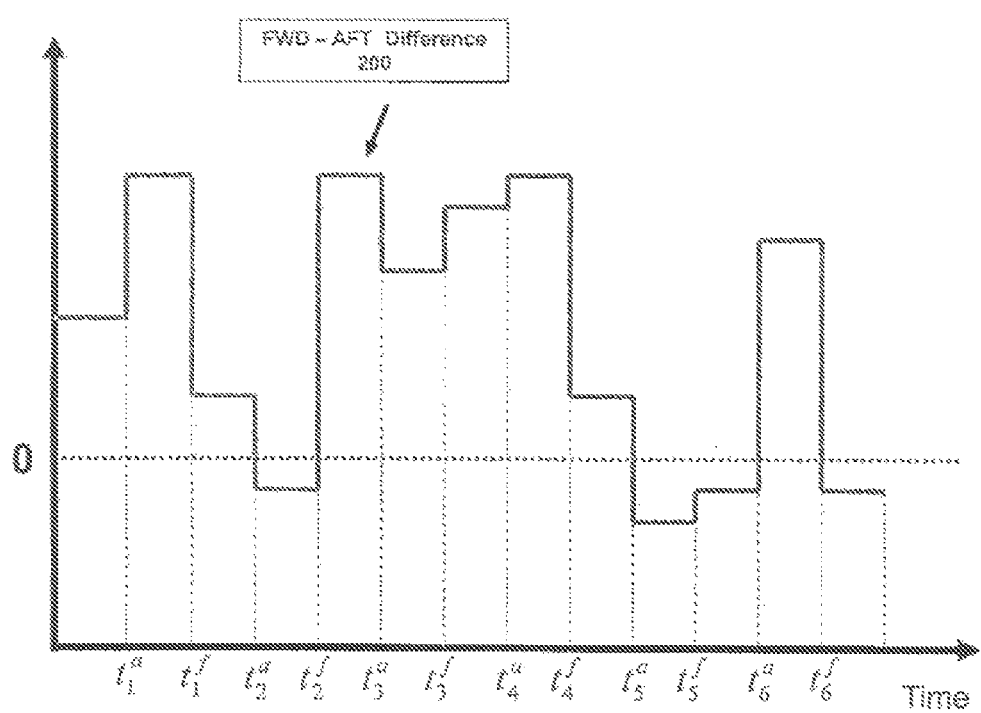
FIG. 2A is a diagram showing the trace of difference between traces 100 and 102 shown in FIG. 1
Figure 2B:
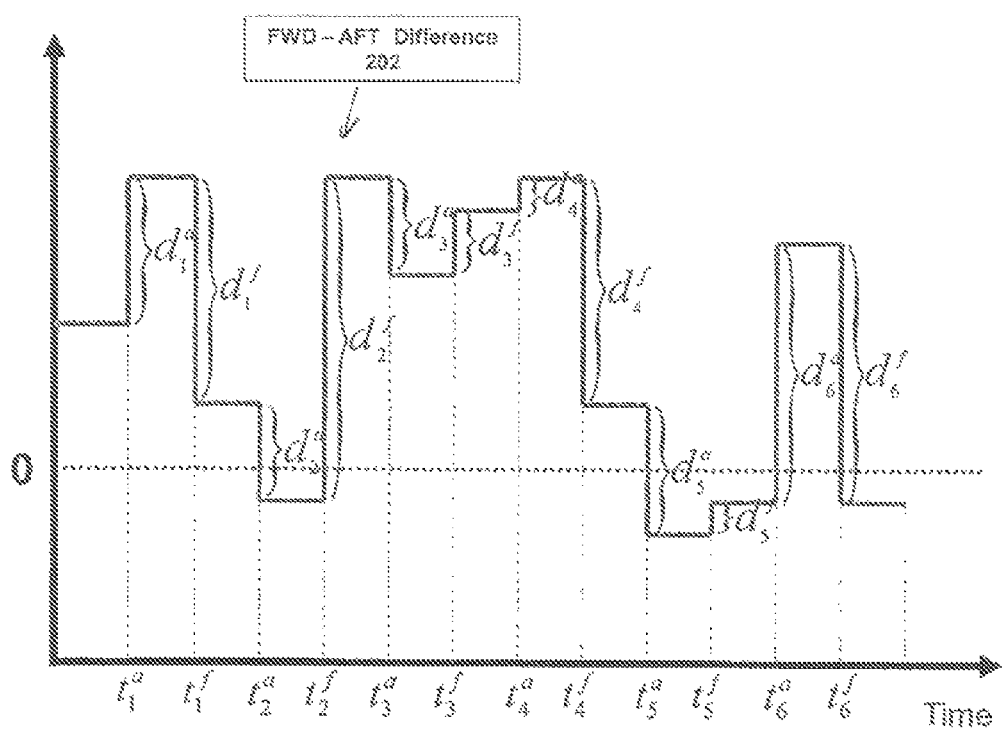
FIG. 2B is a diagram showing the trace of the difference between traces 100 and 102 with the differences between the steps in this trace attributed to the respective gyro output that changed due to a new bias occurring at the time of indexing.

Steps in the first difference of attitude difference due to indexing are now generally discernable. These transitions occur at the indexing times during the gimbal motion of either gyroscope. After gimbal motion of one gyro finishes, the attitude difference becomes essentially constant, up to measurement noise, measurement quantization and platform flexure. The process repeats itself when the other IMU indexes: a step is seen in the attitude difference, and so on, with each index motion. The average or smoothed attitude difference value between the transitions is assigned to the time of indexing for the FWD and AFT gyroscopes, $t_i^f$ or $t_i^a$ respectively. This difference of FWD and AFT attitude, traces 100 and 102 in FIG. 1, is formed, as shown as trace 202 in FIG. 2A. The steps, or second difference of the FWD minus AFT difference, is assigned to the respective gyroscope that last indexed, $d_i^a$ or $d_i^f$ in FIG. 2B. The second differences associated with one gyroscope, are cumulatively summed. The linear trend and offset of these cumulative sums is removed from each sum, forming the final bias correction for that gyroscope.

The final correction is subtracted from the attitude during the respective indexing interval leaving a final attitude output, still with residual estimation errors, as shown in traces 300 and 302 of FIG. 3.

During the time interval when neither the FWD nor the AFT IMU is in transition (i.e., indexing) the attitude difference is assumed to be constant. These intervals are defined by: $t_i^f + 10, t_i^a$) and ($t_i^a + 10, t_{i+1}^f$).

The estimated time of index for the AFT IMU denoted by $t_i^a$ is the estimated time of index for the AFT IMU that occurs between two successive FWD IMU indexes denoted by $t_i^f$ and $t_{i+1}^f$. The estimated time of index for the FWD IMU denoted by $t_{i+1}^f$ is the estimated time of index of the FWD IMU that occurs between two successive AFT IMU indexes denoted by $t_i^a$ and $t_{i+1}^a$. In some embodiments, the estimate of the attitude difference during these intervals is determined by a batch least squares estimate for non-real time estimation of the step during the ($t_i^f + 10, t_i^a$) and ($t_i^a + 10, t_{i+1}^f$) intervals, or a Kalman filter for the all times, or for real time estimation. Again, the value 10, above, is used as an example of the time from beginning to end of the gimbal motion.

Calculating the Correction to the Reported Attitude Using the Estimated Attitude Difference Consider two successive AFT gyro indexes at times $t_{i-1}^a$ and $t_i^a$. Between these two AFT (IMU) gyro indexes a FWD (IMU) gyro index will occur. The time of the FWD gyro index is denoted by $t_i^f$. For times $t_k$ in the interval ($t_i^f, t_i^f + 10$) the indexing step/jump for the FWD gyro is given by the difference between the estimate of attitude difference in the interval ($t_i^f, t_i^f + 10$) calculated by the recursive estimator and the estimate of the attitude difference in the interval ($t_{i-1}^a + 10, t_i^f$) denoted by $a_i^f$. The estimate from the recursive estimator during the interval ($t_i^f, t_{i-1}^f + 10$) is denoted $\hat{a}^f(t_k)$. The indexing step for the FWD gyro attitude during this interval is not constant and is therefore represented by a function of time. This time-dependent magnitude is denoted by $L_i^f(t_k) = \hat{a}^f(t_k) - a_i^f$.

For times t in the interval ($t_i^f + 10, t_{i+1}^f$) the step of the index reported from the FWD navigation system is given by the difference between the estimate of the attitude difference given for the interval ($t_i^f + 10, t_{i+1}^f$) and the estimate of the attitude difference in the interval ($t_{i-1}^a + 10, t_i^f$), denoted by $a_i^f$. The estimate for the interval ($t_i^f + 10, t_{i+1}^f$) is given by the least squares method described above and is denoted by $a_{i+1}^f$. The step of the index corresponding to this interval is assumed modeled as essentially constant, except for gyroscope readout noise and platform flexure between the IMUs, and is given with reference only to the interval ($t_i^f + 10, t_{i+1}^f$) by the subscript i. This magnitude is given $L_i^f = a_{i+1}^{f} - a_i^f$. The cumulative sums of the steps of the FWD gyro at time $t_k$ is given by the sum of the current estimate of the indexing step/jump for the two cases: during the current indexing time window, or at the time of the next AFT gyro index start, and the sum of all previous FWD gyro estimates at the AFT gyro index starts. These cumulative sums are given by, $$C^f(t_k) = \begin{cases} L_i^f(t_k) + \sum_{m=1}^{i-1} L_m^f & t_k \in (t_i^f, t_i^f + 10) \\ L_i^f + \sum_{m=1}^{i-1} L_m^f & t_k \in (t_i^f + 10, t_{i+1}^f) \end{cases}.$$

Similarly, the AFT gyro cumulative sums are given by, $$C^a(t_k) = \begin{cases} L_i^a(t_k) + \sum_{m=1}^{i-1} L_m^a & t_k \in (t_i^a, t_i^a + 10) \\ L_i^a + \sum_{m=1}^{i-1} L_m^a & t_k \in (t_i^a + 10, t_{i+1}^a) \end{cases}.$$

Figure 5:
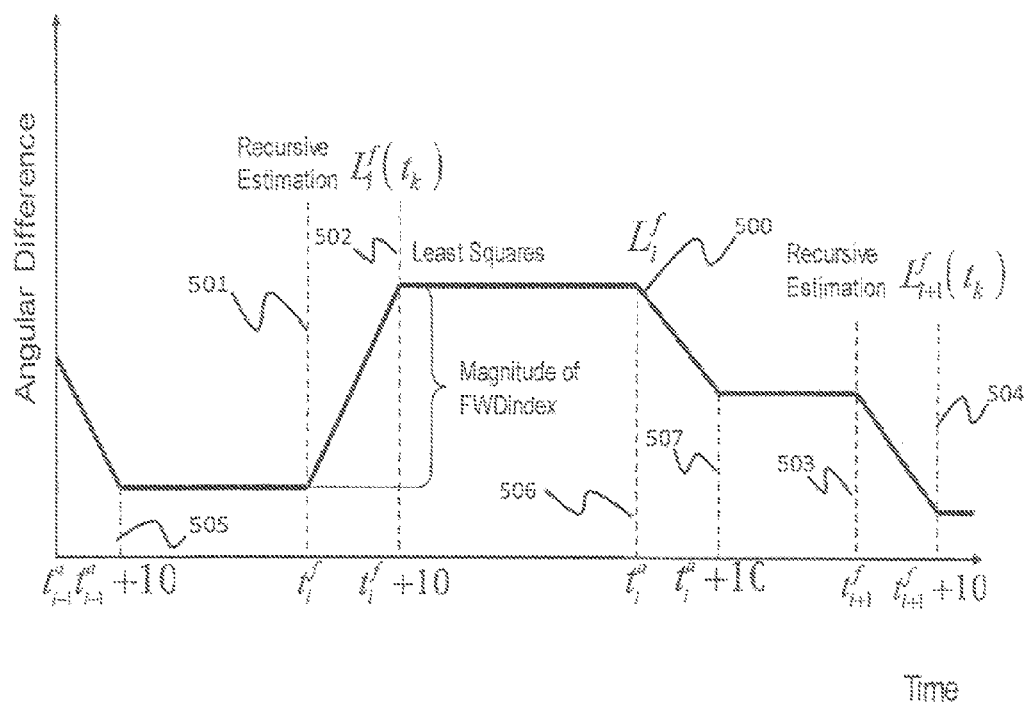
FIG. 5 is a diagram of the attitude difference with two AFT gyro indexing operations and two FWD gyro indexing operations.

FIG. 5 shows an example of attitude difference with two AFT gyro indexes and two FWD gyro indexes. This is given by the black line. The vertical dashed lines 501, 502, 503, 504 represent the start and stop of the FWD gyro index times. The vertical dashed lines 505, 506, 507 represent the start and stop of the AFT gyro index times. During the (indexing) time that the attitude difference is experiencing a transition, the estimate of the attitude difference can be estimated using a Kalman filter. During the interval that the attitude difference is constant, the estimate of the attitude difference can be given by a least squares method.

Figure 6:
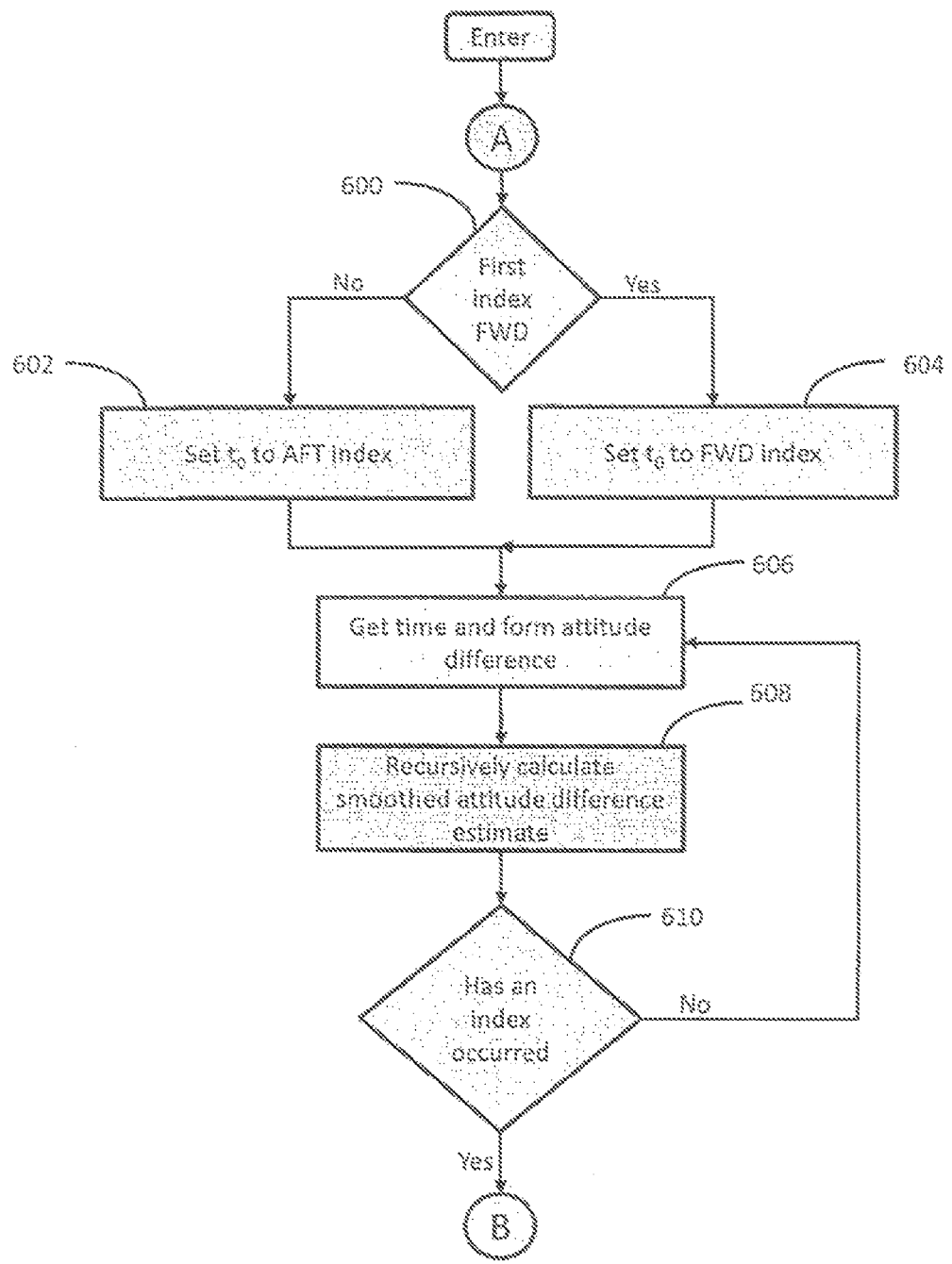
FIGS. 6 and 7 are flow charts showing the operational flow of an exemplary index bias determination method.
Figure 7:
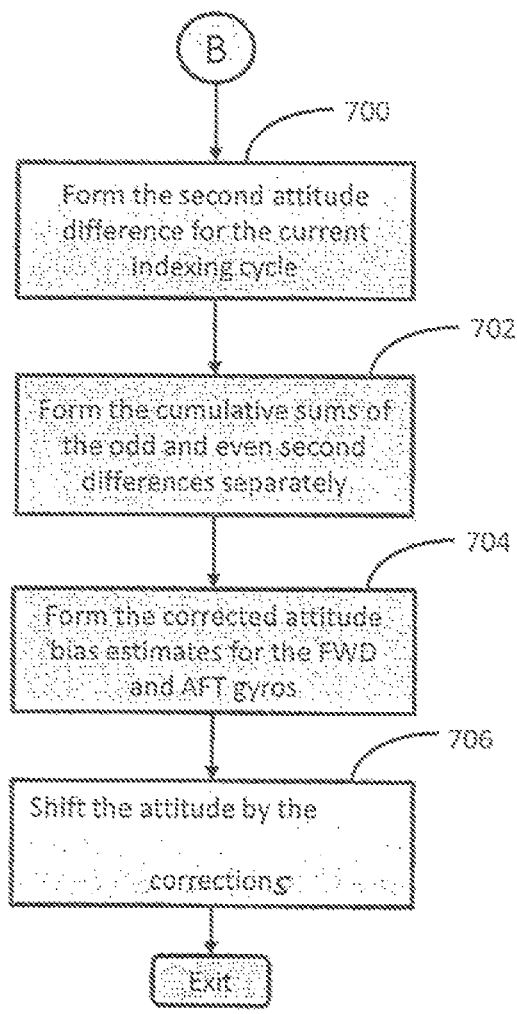

FIGS. 6 and 7 are flowcharts showing the logic flow for the step 404 of FIG. 4, "Determine indexing bias." This algorithm estimates the attitude difference either by using a dynamic recursive estimation, e.g. a Kalman filter, or by estimating the attitude difference measurements by a least-squares method. The estimate of the attitude difference in conjunction with the estimated times of indexing determined in block 402 are used to calculate a correction for the FWD and AFT gyro reported attitude.

Referring to now to the flow chart of FIG. 6, step 600 compares the times of the first FWD gyro index time to the first AFT gyro index time to determine if the first index time corresponds to the FWD gyro. If this is true then the logic flows to step 604. If this is not true then the logic flows to step 602.

Step 602 sets the first index in the AFT gyro index time array to the first time of the data arrays.

Step 604 sets the first index in the FWD gyro index time array to the first time of the data arrays.

Step 606 calculates the inter arrival time given by subsequent time measurements denoted by $t_{k+1}$ and $t_k$. In addition the attitude difference at time $t_{k+1}$ is retrieved.

Step 608 calculates an estimate of attitude difference using a two-state linear Kalman filter.

Step 610 is a logical block to determine if the current time corresponds to an indexing time. If the current time greater than or equal time of index then an index has occurred then the logic flows to FIG. 7. If indexing has not occurred, then the logic flows back to step 606.

Referring to FIG. 7, step 700 forms the step estimated in the attitude difference for the last gyroscope that indexed.

Step 702 forms the cumulative sum of the odd and even steps, separately.

Step 704 forms the corrected bias estimates for the FWD and AFT gyros by subtracting the respective means and linear trends.

Step 706 shifts the FWD and AFT gyro attitudes by the FWD and AFT gyro corrections.

The sum of index steps is referenced to the first mean difference calculated. This may not be the zero bias level. It is based on the assumption that the envelope of index biases is symmetric about the zero bias level, that adjusting the correction estimated to each gyro by the mean of the envelope of the indexing steps, will result in corrected attitude with a mean near the long term mean attitude error. This residual mean bias away from true zero attitude error can only be estimated and removed by a process with reference to the externally known true mean bias. Although examples are described above involving shipboard navigation systems, the methods described herein may be applied to other applications involving at least two gyroscopes that are indexed to reduce the indexing bias. In navigation systems with more than two IMUs, this methodology can be applied to pairs of IMUs.

Figure 8:
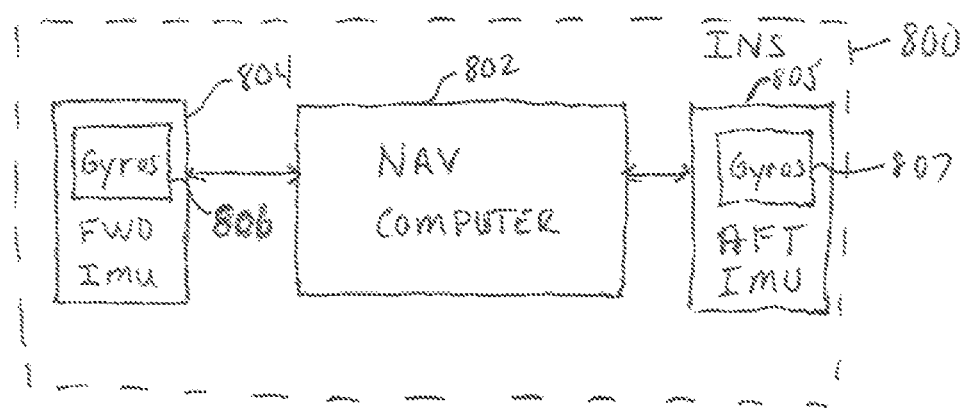
FIG. 8 is a block diagram of an embodiment of an INS for implementing the method of the present disclosure.

FIG. 8 is a block diagram of an embodiment of an INS 800 for implementing the method of the present disclosure. The INS comprises a navigation computer 802 and FWD and AFT IMUs 804 and 805, respectively, in data communication with the navigation computer 802. The FWD IMU 804 includes three gyroscopes 806 and the AFT IMU includes three gyroscopes 807. The gyroscopes 806 and 807 provide angular rate (roll, pitch, and heading) information or data to the navigation computer 802, which allows the INS 800 to automatically and continuously calculate and indicate the roll, pitch, and heading of a vehicle (not shown), such as, but not limited to a platform, a missile, and a rocket, in relation to the earth's rotation.

The navigation computer 802 may include without limitation a mainframe computer system, a workstation, a personal computer system, a personal digital assistant (PDA), or other device or apparatus having at least one processor that executes instructions from a memory medium. The navigation computer 802 may include one or more memory mediums on which one or more computer programs or software components may be stored. The one or more software programs which are executable to perform the methods described herein, may be stored in the memory medium. The one or more memory mediums may include, without limitation, CD-ROMs, floppy disks, tape devices, random access memories such as but not limited to DRAM, SRAM, EDO RAM, and Rambus RAM, non-volatile memories such as, but not limited hard drives and optical storage devices, and combinations thereof. In addition, the memory medium may be entirely or partially located in one or more associated computers or computer systems which connect to the computer system over a network, such as the Internet.

Further, the navigation computer 802 may also be implemented in hardware, a combination of software and hardware, or in other suitable implementations. The methods described herein implemented in software may be executed by the processor of the computer 802 or the processor or processors of the one or more associated computers or computer systems connected to the system computer 802.

Although the methods and system of the disclosure have been described in terms of exemplary embodiments, it is not limited thereto. Rather, the appended claims should be construed broadly, to include other variants and embodiments of the methods and systems of the disclosure, which may be made by those skilled in the art without departing from the scope and range of equivalents of the methods and systems of the disclosure.

What is claimed is:

1. In a navigation system having two inertial measurement units, each of the two inertial measurement units including a gyroscope mounted to an object, each gyroscope having three attitude axes, each gyroscope providing a respective attitude output, each gyroscope periodically being subject to a periodic gimbal reorientation or indexing, a method for recovering attitude accuracy from the inertial measurement units, comprising:
   determining in a computer process, a readout error bias in each gyroscope relative to a true, unknown, long term mean bias in each attitude axis thereof due to the gimbal reorientation or indexing of each gyroscope;
   obtaining in a computer process, time-aligned respective attitude outputs of the gyroscopes;
   determining in a computer process, first differences between the respective attitude outputs of the gyroscopes;
   determining in a computer process, steps in the first differences between the respective attitude outputs of the gyroscopes, due to each successive index;
   determining in a computer process, odd cumulative sums of odd numbered ones of the steps and assigning of the odd cumulative sums to the gyroscope that gave rise to the odd numbered steps in the difference between attitude outputs;
   determining in a computer process, even cumulative sums of even numbered ones of the steps and assigning the even cumulative sums to the other gyroscope that gave rise to the even numbered steps in the difference between attitude outputs;
   determining in a computer process, a mean and linear trend of the odd cumulative sums;
   determining in a computer process, a mean and linear trend of the even cumulative sums;
   determining in a computer process, adjusted odd cumulative sums by subtracting the odd mean and linear trend, and designating the resultant values as an indexing readout error correction of the gyro associated with the odd numbered steps;
   determining in a computer process, adjusted even cumulative sums by subtracting the even mean and linear trend, and designating the resultant values as an indexing readout error correction of the other gyro associated with the even numbered steps; and
   storing a final indexing readout error bias corrections in a machine readable storage medium.

2. The method of claim 1, wherein the final indexing readout error bias corrections are subtracted from the attitude outputs of each of the gyroscopes, for use in controlling movement or orientation of the object.

3. The method of claim 1, wherein the storing of the indexing readout error bias corrections is performed during and between occurrences of indexing.

4. The method of claim 1, wherein the determining of the steps in the attitude difference is performed at the times associated with the gyro that previously indexed, caused the step.

5. The method of claim 1, wherein the identified steps are segregated into those belonging to the respective gyroscopes and further comprising cumulatively summing the respective segregated steps.

6. The method of claim 1, wherein the steps are recursively estimated.

7. The method of claim 1, further comprising removing in a computer process, the mean and linear trend of the odd and even cumulative sums of the steps from the respective gyroscope to form the final index bias corrections, associated with the time interval of each step or jump.

8. The method of claim 1, wherein the indexing includes sampling measurements indicative of the rotation of the earth in a plurality of orientations using each of the gyroscopes.

9. A system for recovering attitude accuracy from two inertial measurement units of a navigation system, each of the two inertial measurement units including a gyroscope mounted to an object, each gyroscope having three attitude axes, each gyroscope providing a respective attitude output, each gyroscope periodically being subject to a periodic gimbal reorientation or indexing, the system comprising:
 a machine readable storage medium; and
 a processor execution instructions for:
  determining a readout error bias in each gyroscope relative to a true, unknown, long term mean bias in each attitude axis thereof due to the gimbal reorientation or indexing of each gyroscope;
  obtaining time-aligned respective attitude outputs of the gyroscopes;
  determining differences between the respective attitude outputs of the gyroscopes;
  determining steps in the differences between the respective attitude outputs of the gyroscopes, due to each successive index;
  determining odd cumulative sums of odd numbered ones of the steps and assigning of the odd cumulative sums to the gyroscope that gave rise to the odd numbered steps in the difference between attitude outputs;
  determining even cumulative sums of even numbered ones of the steps and assigning the even cumulative sums to the other gyroscope that gave rise to the even numbered steps in the difference between attitude outputs;
  determining a mean and linear trend of the odd cumulative sums;
  determining a mean and linear trend of the even cumulative sums;
  determining adjusted odd cumulative sums by subtracting the odd mean and linear trend, and designating the resultant values as an indexing readout error correction of the gyro associated with the odd numbered steps;
  determining adjusted even cumulative sums by subtracting the even mean and linear trend, and designating the resultant values as an indexing readout error correction of the other gyro associated with the even numbered steps; and
  storing a final indexing readout error bias corrections in the machine readable storage medium.

10. The system of claim 9, wherein the final indexing readout error bias corrections are subtracted from the attitude outputs of each of the gyroscopes, for use in controlling movement or orientation of the object.

11. The system of claim 9, wherein the storing of the indexing readout error bias corrections is performed during and between occurrences of indexing.

12. The system of claim 9, wherein the determining of the steps in the attitude difference is performed at the times associated with the gyro that previously indexed, caused the step or jump.

13. The system of claim 9, wherein the identified steps are segregated into those belonging to the respective gyroscopes and wherein the processor executes further instructions for cumulatively summing the respective segregated steps.

14. The system of claim 9, wherein the steps are recursively estimated.

15. The system of claim 9, wherein the processor executes further instructions for removing in a computer process, the mean and linear trend of the odd and even cumulative sums of the steps from the respective gyroscope to form the final index bias corrections, associated with the time interval of each step or jump.

16. The system of claim 9, wherein the indexing includes sampling measurements indicative of the rotation of the earth in a plurality of orientations using each of the gyroscopes.

17. In a navigation system having two inertial measurement units on a platform, each of the two inertial measurement units including three gyroscopes mounted, each gyroscope measuring and reporting as output the attitude of its axis with respect to a selected coordinate system of the platform, each inertial measurement unit mounted in a set of gimbals, that periodically reorient the inertial measurement unit in an indexing process, a method for recovering accuracy in all the reported attitudes, comprising:
 determining in a computer process, error in the attitude output of each gyroscope due to errors of finite precision and/or of mechanical gimbal wear in the indexing process;
 obtaining in a computer process, time-aligned respective attitude outputs of the gyroscopes;
 determining and assigning in a computer process, a first difference between respective attitude outputs, and then the cumulative second differences of the respective attitude outputs between inertial measurement units to the respective inertial measurement unit's gyroscope attitude output for an interval following the respective indexing event;
 determining in a computer process, debiasing and detrending of the cumulative differences as a final error correction;
 and storing the final indexing error correction for all three attitude outputs of each of the inertial measurement units in a machine readable storage medium.

18. A system for recovering attitude accuracy from two inertial measurement units of navigation system, each of the two inertial measurement units including three gyroscopes on a platform, each gyroscope measuring and reporting as output the attitude of its axis with respect to a selected coordinate system of the platform, each inertial measurement unit mounted in a set of gimbals, that periodically reorient the inertial measurement unit in an indexing process, the system comprising:
 a machine readable storage medium; and
 a processor execution instructions for:
  determining error in the attitude output of each gyroscope due to errors of finite precision and/or of mechanical gimbal wear in the indexing process;
  obtaining time-aligned respective attitude outputs of the gyroscopes;
  determining and assigning cumulative differences of the respective attitude outputs between inertial measurement units to the respective inertial measurement unit's gyroscope attitude output for an interval following the respective indexing event;
determining debiasing and detrending of the cumulative differences as a final error correction;
and storing the final indexing error correction for all three attitude outputs of each of the inertial measurement units in the machine readable storage medium.

* * * * *